Patented Feb. 13, 1923.

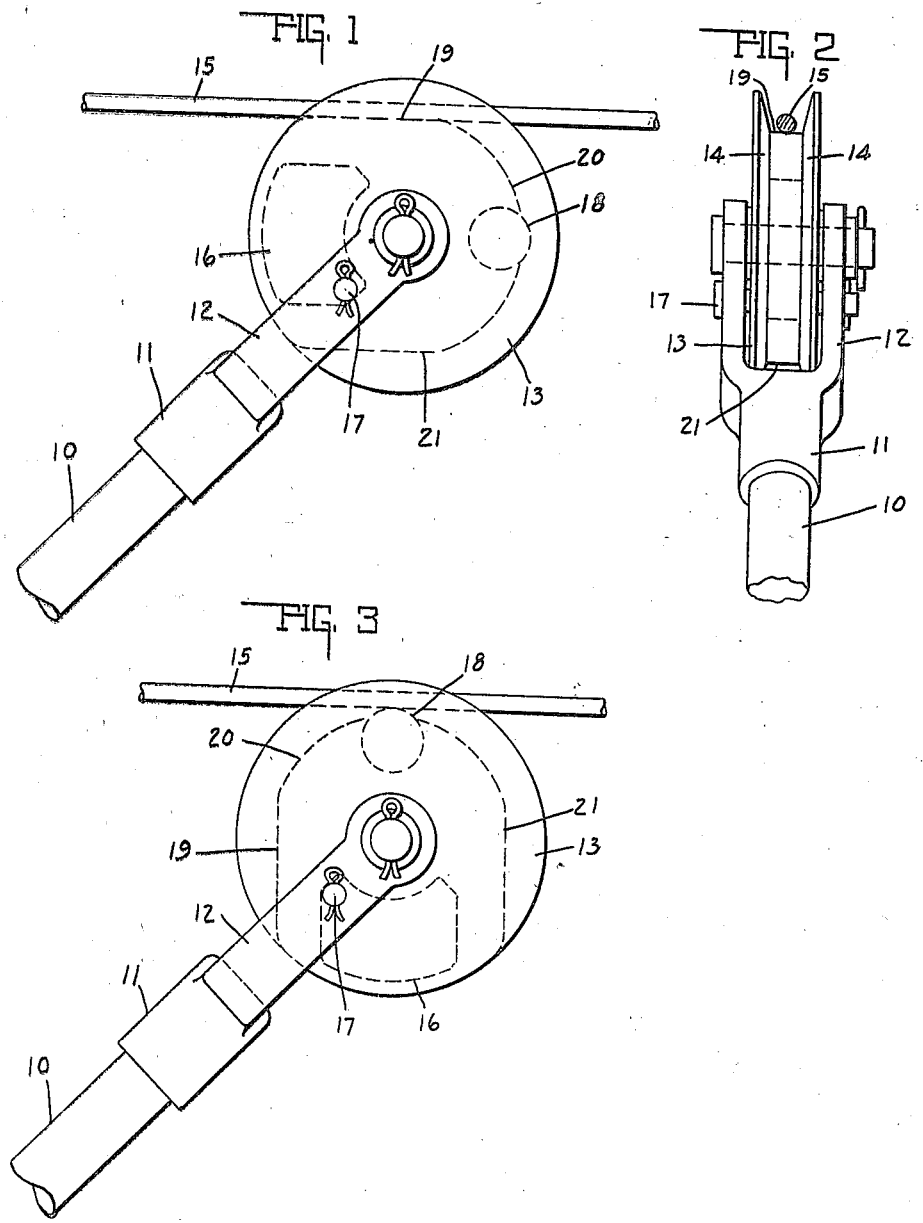

1,445,391

UNITED STATES PATENT OFFICE.

HENRY B. COATS, OF VEEDERSBURG, INDIANA.

SLIDING-TROLLEY SHOE.

Application filed February 24, 1922. Serial No. 538,873.

*To all whom it may concern:*

Be it known that I, HENRY B. COATS, a citizen of the United States and a resident of Veedersburg, county of Fountain, and State of Indiana, have invented a certain new and useful Sliding-Trolley Shoe; and I do hereby declare that the following is a full, clear, and exact description thereof, reference being had to the accompanying drawings, in which like numerals refer to like parts.

This invention relates to a sliding trolley for conducting a driving current from the overhead trolley wire to the motor of an electric car.

The main object of the invention is to provide a simplified sliding trolley construction so arranged that when the car is moving forward a flat contact surface will engage the trolley wire for effecting a better contact of greater area than is obtained with the usual wheel construction, and which will operate upon the car moving in the opposite direction or to the rear so as to present a separate and distinct contact surface to the trolley wire from the surface in contact when going forward. Whereas the sliding trolley has always been highly desirable, difficulty has been experienced in providing such a trolley wherein it will readily slide when the car is reversed, due to the position of the pole. Complicated constructions have heretofore been devised for providing a sliding trolley when the car moves forward and upon said car being reversed to automatically throw into contact with the wire a revolving wheel. This construction is both complicated and expensive and presents difficulty when the trolley jumps the trolley wire and engages the supporting transverse cables which will catch thereon and either break the trolley wheel or supporting cable. This invention accomplishes all that is desired of such constructions in the most simple and inexpensive manner and eliminates any danger of catching upon the supporting cables.

The invention consists primarily in the usual flange trolley wheel mounted in the usual manner, but instead of having a circular groove between the flanges, it is provided with a flattened groove having two flat surfaces for engagement with the trolley wire, one of the surfaces acting as a sliding shoe contact when the car moves forward and upon the car being reversed the intermediate rounded surface having a roller will engage the trolley wire, upon the wheel making substantially one quarter revolution.

The full nature of this invention will be understood from the accompanying drawings and the following description and claims.

In the drawings Fig. 1 is a side elevation showing the trolley wheel in engagement with the trolley wire when the car is moving forward. Fig. 2 is a front elevation of the same as shown in Fig. 1. Fig. 3 is a side elevation showing the reversing movement of the trolley wheel.

In the drawings there is shown a trolley pole 10 having a sleeve 11 rigidly secured on the end thereof which is provided with the usual harp 12 integral with said sleeve in which the trolley wheel 13 is pivotally mounted.

The trolley wheel 13 is provided with annular flanges 14 of the usual type for embracing the trolley wire 15 from which the driving current of the car is conducted through the trolley wheel, harp, and pole. The wire engaging surface between the flanges 14 is substantially flat, as shown in Fig. 2, so as to present a maximum lateral wearing surface to the trolley wire. Instead of the wire engaging surface being circular as is customary in such trolley wheels, it is substantially oval, as shown in Fig. 3, presenting two flat engaging surfaces, said surfaces being joined by a rounded surface. Each of the engaging surfaces so presented provides a sliding contact surface for engagement with the wire 15, excepting when the car moves to the rear, when an engaging roller 18 will be presented to make contact with the wire.

For maintaining the trolley wheel in fixed position so as to prevent its rotation within the harp, and to cause the sliding engagement of the wire, there is provided an opening 16 through which a pin 17 extends. Said pin is fixed to the harp and therefore permits the wheel to revolve only within the limits permitted by the opening 16. Said opening may also be cut away to properly balance the wheel upon its pivotal mounting.

From the above described construction it will be apparent that when the car is moving forward, the trolley wheel will rotate to a position shown in Fig. 1 until the pin 17 engages the end of the opening 16. The movement of the car and frictional engagement with the wire 15 will, therefore, maintain the wheel in fixed position against said pin so that the engaging surface 19 will make contact with the wire. This surface extending longitudinally of the wire and being flat, will slide thereon and give an increased area of contact so as to minimize the arcing of the electricity and thereby effect a saving in current. Upon the car being reversed, the pressure and friction exerted upon the wire 15 by the trolley wheel, due to the angular position of the pole, will tend to cause the wheel to turn as far as possible. The wheel being free to rotate a short distance will so turn until the contact surface 20 and the roller 18 are presented to the wire, the wheel being then stopped by the engagement of the opposite end of the opening 16 with the pin 17. This movement of the wheel will overcome the maximum friction due to the reversing movement, and it will, therefore, freely slide to the rear upon the roller 18 and rounded surface. It will be obvious that upon the wearing down of the surface 19, the wheel may be taken out of the harp and reversed so as to present the sliding surface 21 to the wire.

The invention claimed is:

1. A contact member for trolleys adapted to be mounted on a trolley harp, said member comprising a contacting portion having a plurality of contact and wire engaging surfaces joining each other, a wire engaging roller rotatably positioned in one of said wire engaging surfaces for rotatably engaging said wire when the surface carrying said roller is presented thereto, and means on said harp for limiting the movement of said member for maintaining one of said surfaces in sliding engagement with a trolley wire.

2. A contact member for trolleys having flanged sides for embracing a trolley wire, a contacting and wire engaging portion positioned between said flanges and having a substantially straight surface, a curved surface joining with said straight surface, and a roller mounted on said curved surface for rotatably engaging a trolley wire when said curved surface is presented thereto.

3. In a trolley construction the combination with a trolley wire, of a pole having a harp thereon and a contact member pivotally mounted in said harp so as to turn therein, said member being provided with wire embracing flanges and having a plurality of flat engaging surfaces between said flanges extending parallel to each other and connected by a curved surface, so arranged that one straight surface will engage the wire when moving in one direction and when moving in the opposite direction will disengage said wire and the curved surface will contact therewith by the turning movement of said member, and a rotatably mounted roller positioned on said curved surface for rotatably engaging with said wire.

4. In a trolley construction the combination with a trolley wire, of a pole having a harp thereon and a contact member pivotally mounted in said harp so as to turn therein, said member being provided with wire embracing flanges and having a plurality of flat engaging surfaces between said flanges extending parallel to each other and connected by a curved surface so arranged that one straight surface will engage the wire when moving in one direction and when moving in the opposite direction will disengage said wire and the curved surface will contact therewith by the turning movement of said member, a rotatably mounted roller positioned in said curved surface for rotatably engaging with said wire when the trolley is moving rearwardly, and means for limiting the turning movement of said member when reversed.

In witness whereof, I have hereunto affixed my signature.

HENRY B. COATS.